A. A. PAULY.
APPARATUS FOR CURING CEMENTITIOUS MATERIAL.
APPLICATION FILED OCT. 15, 1910.
1,009,557.
Patented Nov. 21, 1911.
3 SHEETS—SHEET 3.
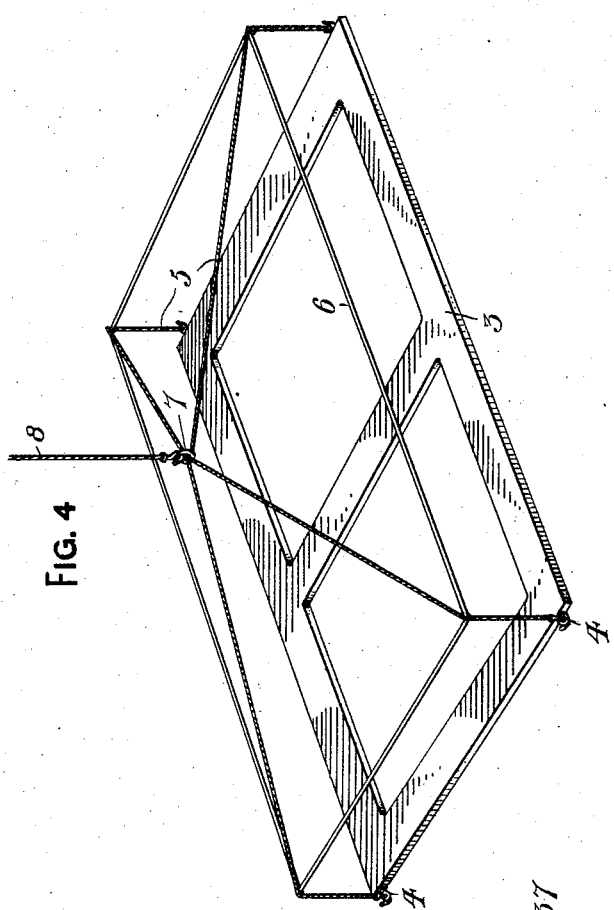
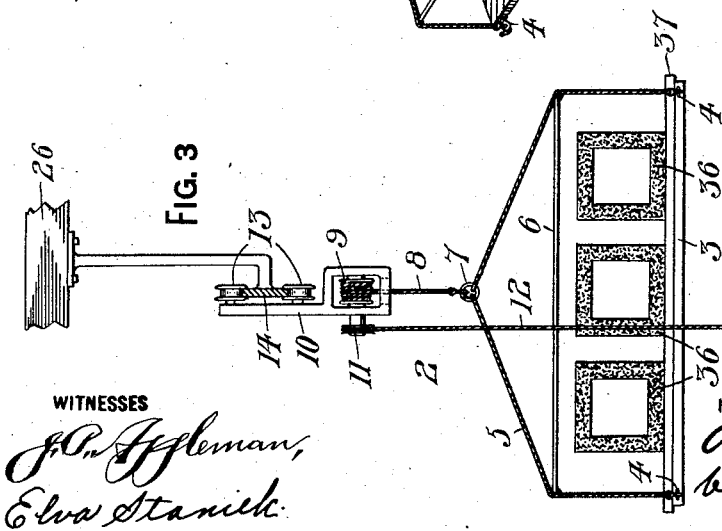
WITNESSES
INVENTOR

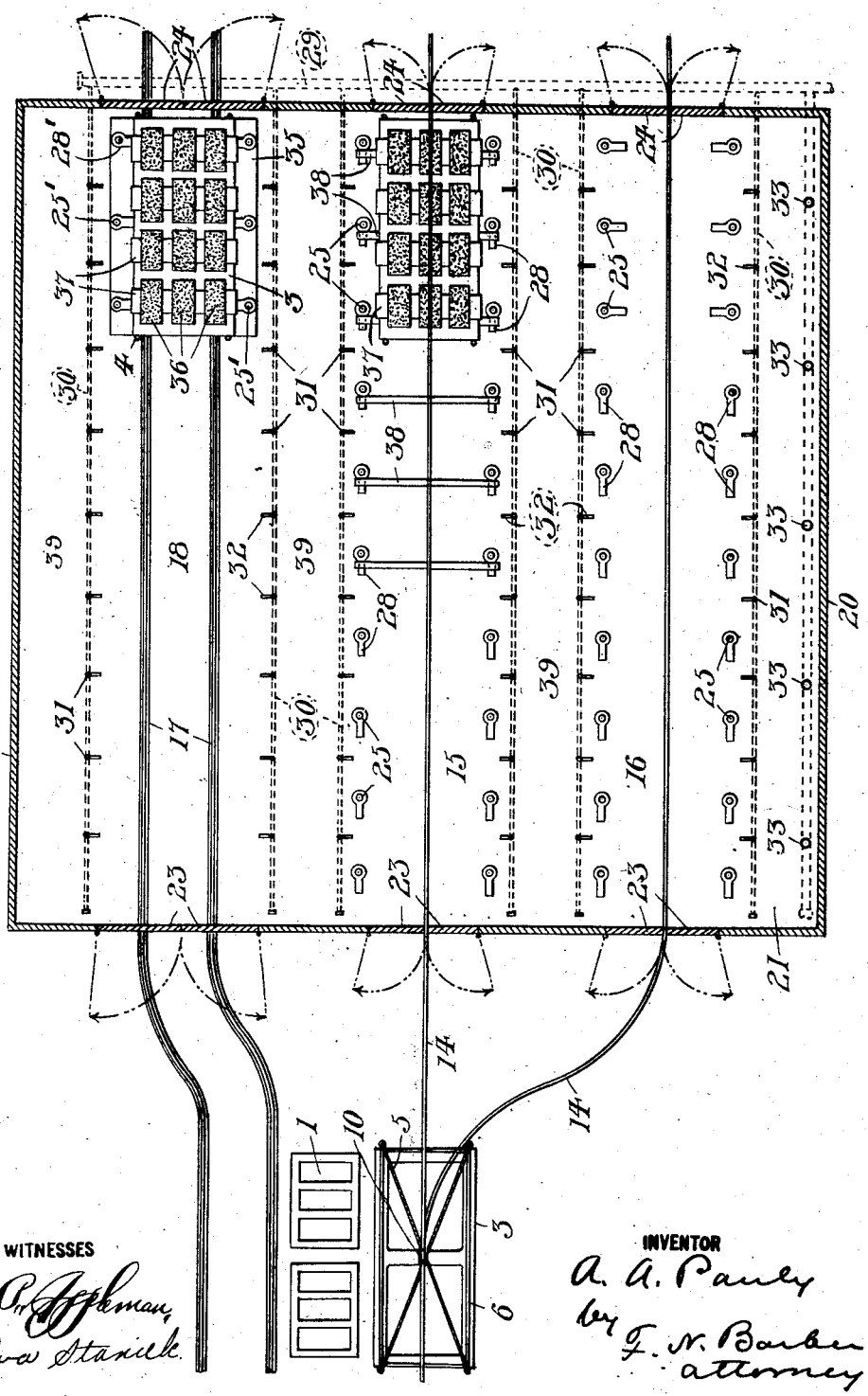

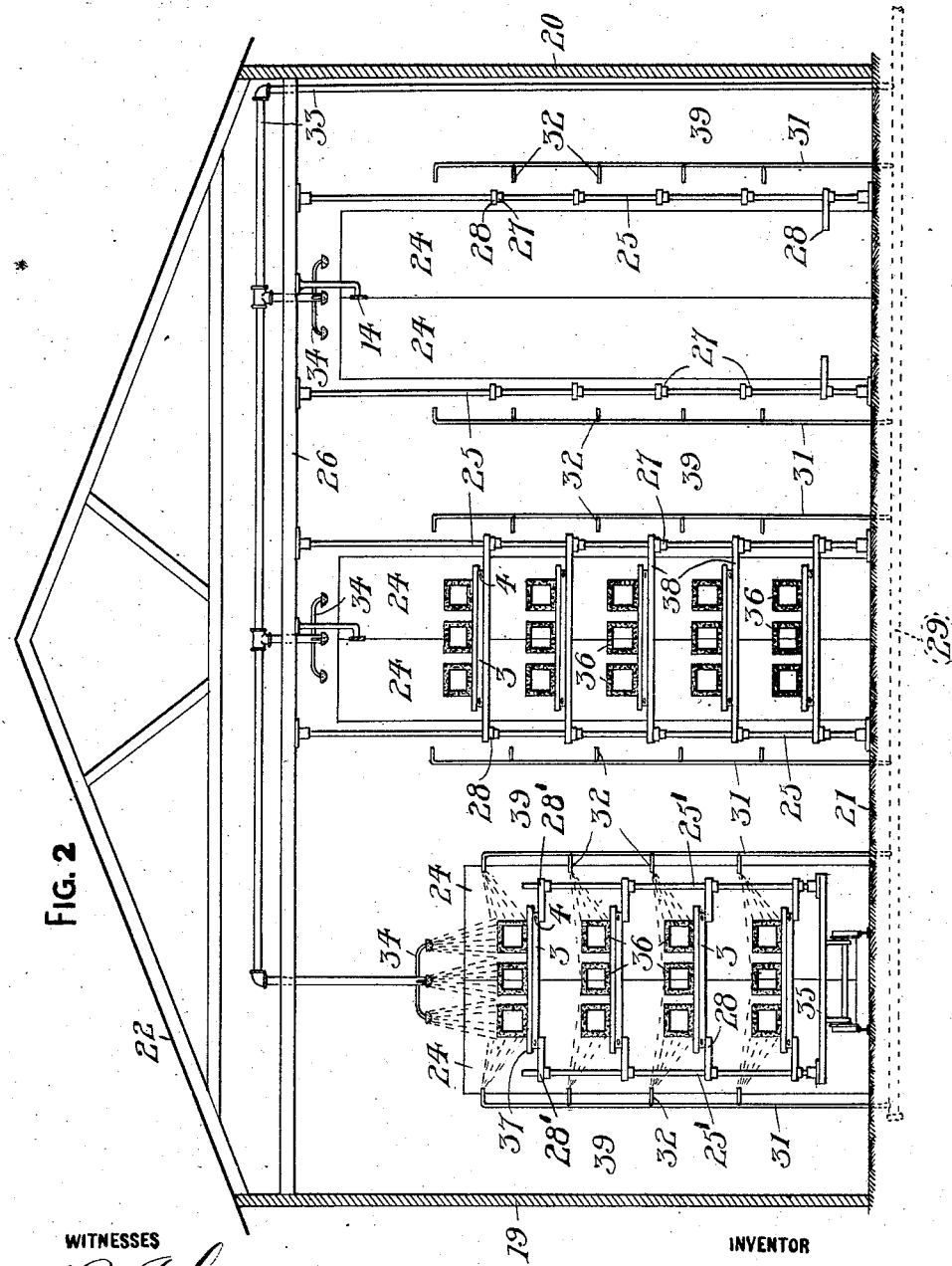

UNITED STATES PATENT OFFICE.

ALBERT A. PAULY, OF YOUNGSTOWN, OHIO.

APPARATUS FOR CURING CEMENTITIOUS MATERIAL.

1,009,557. Specification of Letters Patent. Patented Nov. 21, 1911.

Application filed October 15, 1910. Serial No. 587,175.

*To all whom it may concern:*

Be it known that I, ALBERT A. PAULY, a citizen of the United States, residing at Youngstown, in the county of Mahoning and State of Ohio, have invented new and useful Improvements in Apparatus for Curing Cementitious Material, of which the following is a specification.

My invention relates to apparatus for the storing of cementitious articles for the purpose of curing them, or the treating of them after they have been molded.

In the manufacture of molded articles from material containing Portland or similar cement, I remove them from the molds before they have become thoroughly seasoned or cured. In order to hasten the seasoning process, I place the freshly molded articles in ovens and subject them to the action of steam or water or both. Heretofore, it has been impossible to store a number of layers of articles one over another.

It is the principal object of this invention to provide a curing oven with such adjuncts as will make it as easy to deposit and store the freshly molded articles in superposed layers as it has been heretofore to deposit them in a single layer.

Referring to the accompanying drawings, Figure 1 is a horizontal section through the curing house, or oven, above the top layer of molded articles; Fig. 2, a vertical section, transverse of a curing oven containing my improvements; Fig. 3, an enlarged elevation partly broken away of a portion of my invention showing how the article-holding trays are supported; and Fig. 4, a perspective showing the tray or carriage with its suspending chains and frame.

On the drawings, 1 represents conventional molds for forming cement blocks.

2 is a carriage supported in any desired manner while it is being loaded with freshly molded articles. It consists of a rectangular flat frame or tray 3, having the eyes 4 at the corners, whereby the frame may be connected to the lower ends of the ropes 5 which are connected to the corners of the rectangular chain-spreader frame 6, parallel with the frame 3 and lying over the outer edge thereof. From the corners of the frame 6 the chains 5 have their upper ends brought together centrally over the tray at the point 7 where they are connected by the rope 8 to the drum 9 on the trolley 10. The shaft on which the drum is secured carries any form of hoisting apparatus shown conventionally at 11 and operated by the chain or rope 12. The trolley 10 has a pair of wheels 13 arranged to travel at opposite sides of the overhead tracks 14 leading to the various runways 15 and 16 of the curing house or oven. A surface track 17 leads from the molds 1 or any other convenient molds to the runway 18. The curing house has the sides 19 and 20, the floor 21, the roof 22, the front with the doors 23 for the several runways, and the back with the doors 24 also for the runways.

Each of the runways 15 and 16 has a track 14 centrally and longitudinally arranged therein, each track extending out the back of the curing-house and leading to any desired place (not shown) where the cured cement articles may be deposited. Each of the runways 15 and 16 has therein two rows of vertical posts 25, the rows being each parallel to its respective track 14 and being spaced apart so as to permit the carriage 2 to travel between them. The posts rest on the floor 21 and their upper ends are secured to the beams 26, one being shown on Figs. 2 and 3. The posts 25 have secured thereto the spaced collars 27. Swinging horizontal rests or arms 28 are mounted on the posts and are supported by the collars 27, so that the arms may be swung so as to lie parallel to the tracks 14 as shown in the runway 15 or so as to extend into the runway as shown in the rear part of the runway 16.

29 is a water or steam supply pipe from which the horizontal pipes 30 branch. The pipes 30 lie parallel with the rows of posts 25. Vertical pipes 31 are connected to the branch pipes 30 and stand preferably opposite the spaces between the successive posts in each row. The pipes 31 are provided with branch spraying pipes 32, from which water or steam may be applied, if desired, to the cementitious articles. The branch pipes 33 convey water or steam to the upper part of several runways and connect with sprinkler heads 34 arranged to throw the water or steam down on the cementitious articles.

35 represents a car on the track 17. The car is equipped with the posts 25' and the rests 28' constructed and arranged in rows as the posts 25 and the rests 28, the posts standing in a row at each edge of the car.

The carriage 2 being on the track 14 at the side of the molds is loaded with freshly-molded cementitious articles 36, which are laid on the cross-pieces 37 resting loosely on the frame 3. The carriage is moved by the rope 12 so as to bring the frame 3 just above the level of the rests 28 on which the frame with its load is to be deposited. The trolley 10 is then made to travel on the track 14 to the rear end of the runway 16, for example. An attendant or attendants swing out, for example, three rests on each side of the runway so that they project into the same as shown at the rear of the runway 16. The carriage 2 is lowered until the frames 2 rest on the rests 28 and the ropes 5 can be unhooked from the eyes 4. The carriage returns for another load of articles 36 and three more rests in the second row above the frame just deposited are swung out to receive the second frame loaded with articles 36. This operation is repeated until all the rests on the rear three posts 25 in the runway 16 have frames upon them. Then the next three rests just in front of those in use are swung out into the runway 16 and another vertical series of loaded frames are stored. This process is continued until the runway is full or as long as desired. The runway may be filled by depositing frames on all the lowest rests and then depositing frames on all the rests next above those occupied and so on. By reason of the carriage being vertically movable the frames can be deposited in various orders in the runways. In the runway 15 I have shown the rests parallel with the runway, and with the slats 38 placed across opposite rests. The frames are deposited on the slats 38 as shown instead of on the rest directly. The rests may be non-swinging as well as swinging, if the slats are used. After the articles 36 have been sufficiently cured they may be removed by opening the doors 24. The tracks 14 and 18 are shown extending beyond the doors so that the cars may be run out or the frames 3 removed by a trolley like 10 or otherwise.

It is seen that I have provided a curing or seasoning house or oven for cementitious articles, in which a large number of horizontal layers may be deposited and removed in various orders. The several layers can be deposited as easily as the first. The alleys 39 between the runways and next to the sides 19 and 20 make it easy for attendants to operate the rests and the slats and release the hooks from the eyes 4 or insert the hooks in the eyes readily. All the pipes and other parts are readily accessible for repairs, and adjustments.

I claim—

In a curing apparatus for cementitious articles, a building, a runway therein having at each side a row of vertical posts, a series of horizontal rests pivotally connected to each post so that they may be swung from a position parallel to the runway to a position in which they may extend into the runway, said rests on the several posts being arranged to form a series of horizontal rows, a molding device, an overhead track leading from the molding device and over the runway, a trolley having travel on the track, a carriage on the trolley, means for raising and lowering the carriage, and means on the carriage for supporting articles deposited therein.

Signed at Youngstown, Ohio this 11″ day of October, A. D., 1910.

ALBERT A. PAULY.

Witnesses:
 HUGH SWANEY,
 CHAS. J. JACKSON.

Copies of this patent may be obtained for five cents each, by addressing the "Commissioner of Patents. Washington, D. C."